United States Patent [19]
Engler

[11] Patent Number: 5,937,703
[45] Date of Patent: Aug. 17, 1999

[54] RACK GUIDE

[75] Inventor: Leonard W. Engler, Rochester Hills, Mich.

[73] Assignee: TRW Inc., Lyndhurst, Ohio

[21] Appl. No.: 08/844,032

[22] Filed: Apr. 18, 1997

Related U.S. Application Data

[63] Continuation-in-part of application No. 08/804,989, Feb. 25, 1997.

[51] Int. Cl.$^6$ .................................. B62D 1/20; F16H 1/04
[52] U.S. Cl. .................................................. 74/498; 74/422
[58] Field of Search ..................... 74/498, 422; 180/428, 180/400

[56] References Cited

U.S. PATENT DOCUMENTS

| | | |
|---|---|---|
| 3,747,429 | 7/1973 | Cass . |
| 4,400,991 | 8/1983 | Breitweg et al. . |
| 4,581,952 | 4/1986 | Yabe . |
| 4,593,578 | 6/1986 | Kobayashi et al. . |
| 4,683,769 | 8/1987 | Mochizuki et al. . |
| 4,779,694 | 10/1988 | Adams .................................. 74/498 X |
| 4,785,685 | 11/1988 | Kobayashi et al. . |
| 4,800,770 | 1/1989 | Kobayashi et al. . |
| 4,936,157 | 6/1990 | Kotake et al. . |
| 4,939,947 | 7/1990 | Toyoshima et al. . |
| 5,022,279 | 6/1991 | Ueno et al. . |
| 5,746,285 | 5/1998 | Yonezawa .............................. 74/498 X |

*Primary Examiner*—John A. Jeffery
*Assistant Examiner*—Marcus Charles
*Attorney, Agent, or Firm*—Tarolli, Sundheim, Covell, Tummino & Szabo

[57] ABSTRACT

A rack guide (150) transmits a preloading force from a spring (36) to a steering rack (14) in a rack and pinion steering gear housing (12). The rack guide (150) is a cylindrical structure having an outer peripheral wall surface (154) with a cylindrical contour complementary to a cylindrical inner surface (14) of the housing (12), and further having an end wall surface (158) with a cylindrical contour complementary to a cylindrical surface (56) of the rack (14). The cylindrical structure (150) has relatively movable parts including circumferentially separate segments (170, 172), each of which defines a respective segmental portion of the outer peripheral wall surface (154). The relatively movable parts of the cylindrical structure (150) further include a flexible web (190) which interconnects and supports an adjacent pair of segments (170, 172) for movement relative to each other.

9 Claims, 4 Drawing Sheets

RACK GUIDE

The present application is a continuation-in-part of Applicant's co-pending U.S. patent application Ser. No. 08/804,989, Filed Feb. 25, 1997, also entitled RACK GUIDE.

FIELD OF THE INVENTION

The present invention relates to a rack and pinion steering gear, and particularly relates to a rack guide for supporting a rack in engagement with a pinion in a rack and pinion steering gear.

BACKGROUND OF THE INVENTION

A rack and pinion steering gear has a housing containing a rack and a pinion. The rack has a longitudinally extending row of rack teeth in meshing engagement with helical gear teeth on the pinion. The opposite ends of the rack project outward from the housing, and are connected with a steering linkage and a corresponding pair of steerable vehicle wheels. The pinion is connected with the vehicle steering wheel by an input shaft and a torsion bar. When a steering maneuver is being performed, the pinion rotates, and the rack moves longitudinally. The housing also contains a spring-loaded rack guide which presses the rack against the pinion to maintain the rack teeth in meshing engagement with the gear teeth on the pinion.

SUMMARY OF THE INVENTION

The present invention is a rack guide for transmitting a preloading force from a spring to a steering rack in a rack and pinion steering gear housing. In accordance with the present invention, the rack guide is a cylindrical structure with an outer peripheral wall surface and an end wall surface. The outer peripheral wall surface has a cylindrical contour which is complementary to a cylindrical inner surface of the housing. The end wall surface has a cylindrical contour which is complementary to a cylindrical surface of the rack.

The cylindrical structure has a plurality of relatively movable parts including circumferentially separate segments. Each of the segments defines a respective segmental portion of the outer peripheral wall surface. The relatively movable parts of the cylindrical structure further include a flexible web which interconnects and supports an adjacent pair of segments for movement relative to each other.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS

Figure 1:
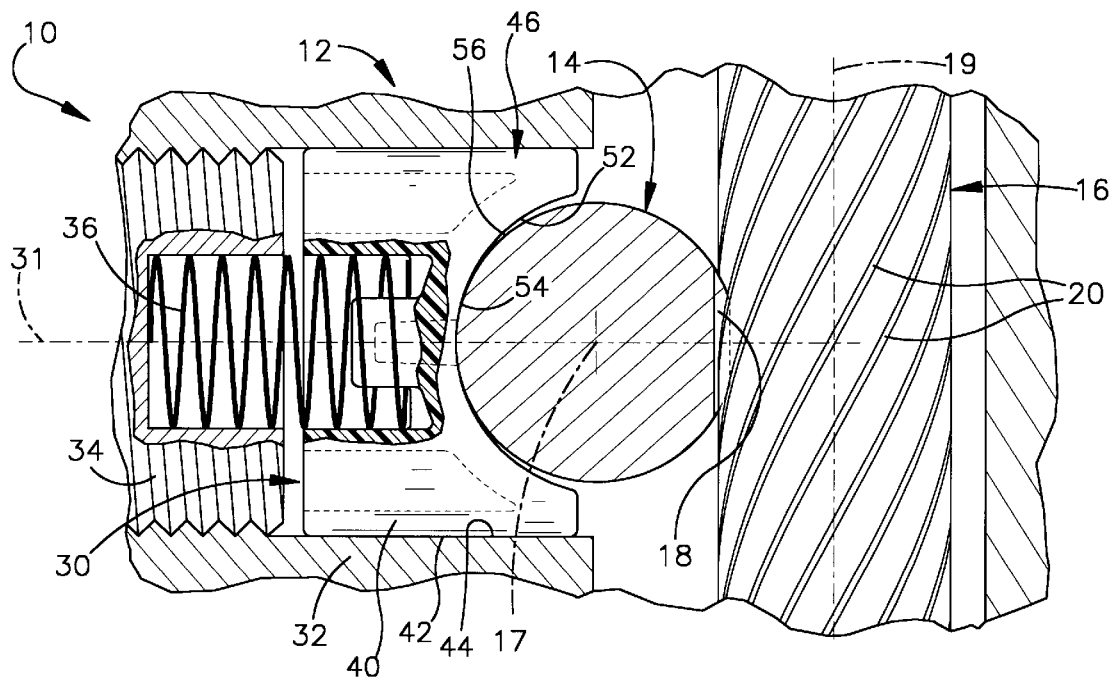
FIG. 1 is a partial view of an apparatus including a rack guide comprising a first embodiment of the present invention.
Figure 2:
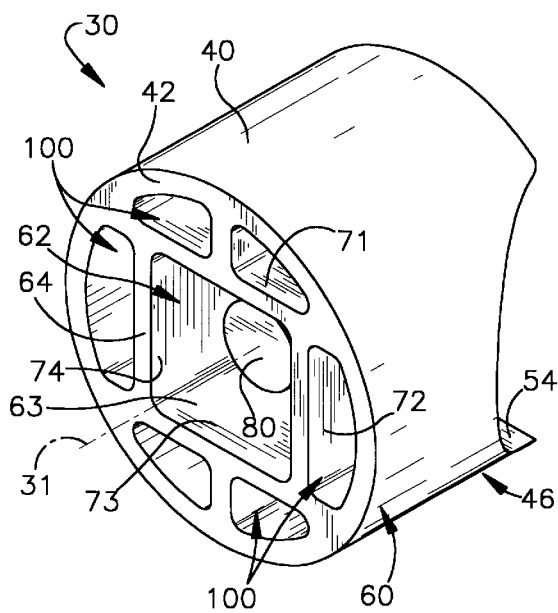
FIGS. 2 and 3 are perspective views of the rack guide of FIG. 1.

An apparatus 10 comprising a first embodiment of the present invention is shown partially in FIG. 1. The apparatus 10 is a rack and pinion steering gear including a housing 12 containing a rack 14 and a pinion 16. The rack 14 has a longitudinal central axis 17 and an axially extending row of rack teeth 18. The pinion 16 has an axis of rotation 19, and has helical gear teeth 20 meshing with the rack teeth 18. As known in the art, the opposite ends of the rack 14 are connected with a steering linkage and a corresponding pair of steerable vehicle wheels. The pinion 16 is connected with the vehicle steering wheel by an input shaft and a torsion bar. When a steering maneuver is being performed, the pinion 16 rotates about the axis 19, and the rack 14 moves longitudinally along the axis 17.

The steering gear 10 further includes a rack guide 30. The rack guide 30 has a cylindrical shape centered on an axis 31 which is perpendicular to the rack axis 17. As shown in FIG. 1, the rack guide 30 is contained in a cylindrical section 32 of the housing 12 between a closure cap 34 and the rack 14. A spring 36 is compressed between the rack guide 30 and the closure cap 34. The spring 36 applies an axially directed preloading force which urges the rack guide 30 forcefully against the rack 14 in a direction extending from left to right, as viewed in FIG. 1. The rack guide 30, in turn, applies the preloading force to the rack 14 so as to hold the rack teeth 18 firmly in meshing engagement with the gear teeth 20 on the pinion 16.

As shown in greater detail in FIGS. 2–5, the rack guide 30 has an outer peripheral surface 40 with a cylindrical contour centered on the axis 31. The outer peripheral surface 40 is defined by a cylindrical peripheral wall 42 of the rack guide 30. As indicated in FIG. 1, the cylindrical contour of the outer surface 40 is complementary to a cylindrical inner surface 44 of the surrounding housing section 32.

Figure 3:
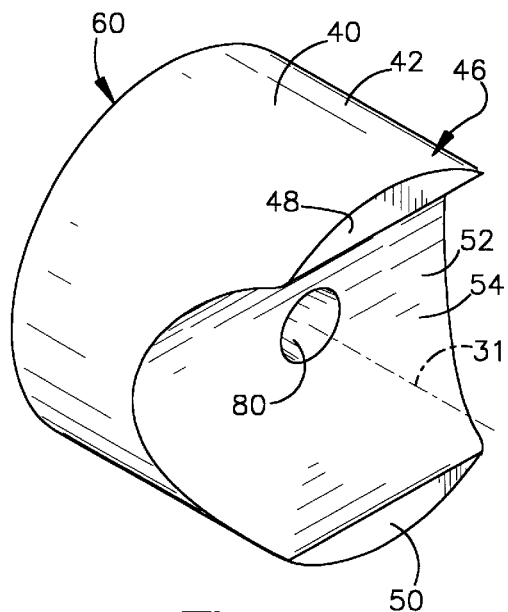

As best shown in FIG. 3, a first end portion 46 of the rack guide 30 includes a pair of diametrically opposed end segments 48 and 50 of the peripheral wall 42. The first end portion 46 of the rack guide 30 further includes a concave end wall 52 with a guide surface 54 extending across the axis 31. The guide surface 54 has a cylindrical contour which is complementary to a cylindrical surface portion 56 (FIG. 1) of the rack 14 opposite the rack teeth 18. When the rack 14 moves longitudinally along the axis 17, it slides against the guide surface 54.

Figure 4:
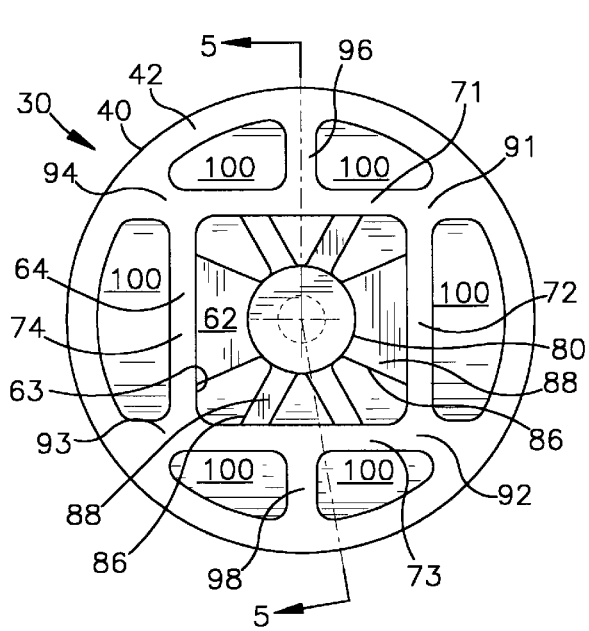
FIG. 4 is an end view of the rack guide of FIG. 1.

A second, opposite end portion 60 of the rack guide 30 defines a compartment 62 for receiving the spring 36. The spring compartment 62 also is centered on the axis 31, and has a rectangular peripheral shape defined by an inner peripheral wall surface 63. The inner peripheral wall surface 63, in turn, is defined by a rectangular inner wall structure 64. The rectangular inner wall structure 64 is preferably square, as best shown in FIG. 4, and thus includes four orthogonal inner walls 71, 72, 73, and 74 with equal lengths extending around the axis 31.

A cylindrical stub shaft portion 80 (FIG. 5) of the rack guide 30 extends partially along the axis 31 from the concave end wall 52 toward the open end of the spring compartment 62. The stub shaft 80 helps to center the spring 36 in the spring compartment 62, and is preferably hollow for weight reduction. A plurality of ribs 86 project radially from the stub shaft 80 to the four surrounding inner walls 71–74. The ribs 86 have coplanar spring-abutment surfaces 88 facing axially outward through the spring compartment 62.

The rectangular inner wall structure 64 is joined with the cylindrical peripheral wall 42 at a plurality of locations. These include the four corners of the rectangular inner wall structure 64. More specifically, four corner junctures 91, 92, 93, and 94 extend radially outward from the four corners of the rectangular inner wall structure 64 to the cylindrical peripheral wall 42. A pair of stiffener walls 96 and 98 extend radially outward from the first and second inner walls 71 and 73 to the cylindrical peripheral wall 42. The stiffener walls 96 and 98 are perpendicular to the first and second inner walls 71 and 73 and intersect the cylindrical peripheral wall 42 at diametrically opposed locations. In this configuration, the rack guide 30 has a plurality of weight-reduction cavities 100. The weight reduction cavities 100 are located radially between the rectangular inner wall structure 64 and the cylindrical peripheral wall 42, and are located circumferentially between adjacent pairs of the corner junctures 91–94 and the stiffener walls 96 and 98. Like the spring compartment 62, the weight-reduction cavities 100 have depths extending axially from their open ends to the concave end wall 52 at the opposite end portion 46 of the rack guide 30.

The rack guide 30 in the preferred embodiment of the present invention is a unitary structure consisting of a single continuous body of molded plastic material. The plastic material, including any reinforcing filler materials, may have any suitable composition known in the art. For example, a particularly suitable plastic material is a glass-filled polyester such as Rynite 545 or similar material with optional modifiers such as Teflon. In any case, the rectangular inner wall structure 64, the corner junctures 91–94, and the stiffener walls 96 and 98, together with the weight-reduction cavities 100, provide high structural rigidity with a low amount of material, i.e., a high performance to weight ratio. The use of less material enables faster molding cycle times with less shrinkage.

Figure 5:
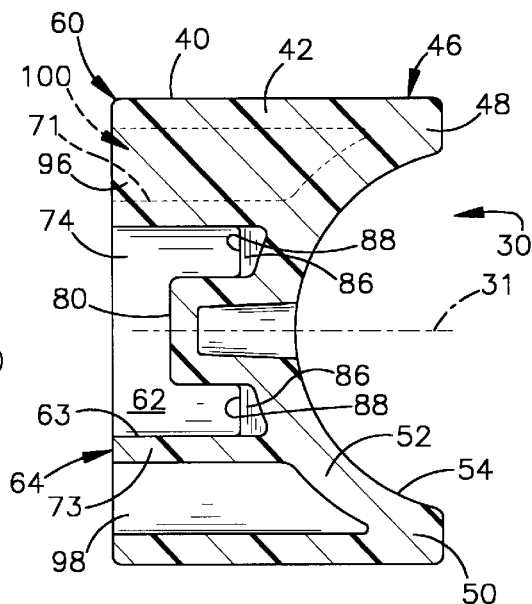
FIG. 5 is a sectional view taken on line 5—5 of FIG. 4.
Figure 6:
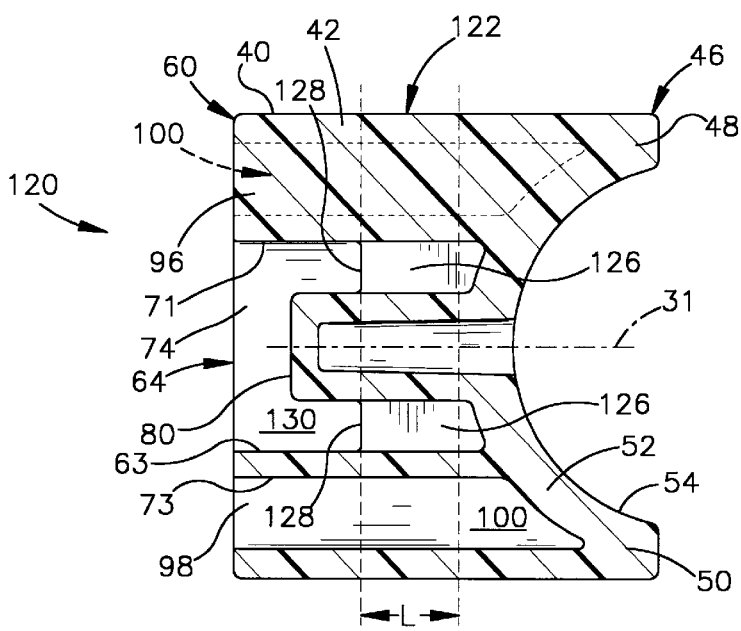
FIG. 6 is a view similar to FIG. 5 showing a rack guide comprising a second embodiment of the present invention.

FIG. 6 is a sectional view similar to FIG. 5 showing a rack guide 120 comprising a second embodiment of the present invention. The rack guide 120 has parts that are substantially similar to corresponding parts of the rack guide 30 described above. This is indicated by the use of the same reference numbers for such parts of the two different rack guides 120 and 30. The rack guide 120 differs from the rack guide 30 in that the rack guide 120 is substantially longer than the rack guide 30. The rack guide 120 is thus constructed for use in a steering gear housing with a cylindrical section that likewise differs from the cylindrical section 32 of the housing 12.

In accordance with the present invention, the increased length of the rack guide 120 is provided by a longitudinally extending section 122 having a length L, as shown in FIG. 6. The rack guide 120 thus has ribs 126 which are axially larger than the ribs 86 (FIG. 5) in the rack guide 30. However, the distance from the spring-abutment surfaces 128 to the open end of the spring compartment 130 is the same as the corresponding distance in the rack guide 30. This enables the rack guide 120 to be used with a spring the same size as the spring 36. Additionally, the various connector portions and wall portions of the rack guide 120 that are located radially outward of the ribs 126 are equally longer than their counterparts in the rack guide 30. The depths of the spring compartment 62 and the weight-reduction cavities 100 in the rack guide 120 are likewise greater. Accordingly, the length of a rack guide constructed in accordance with the present invention can be increased without substantially changing the performance to weight-ratio of the rack guide.

Figure 7:
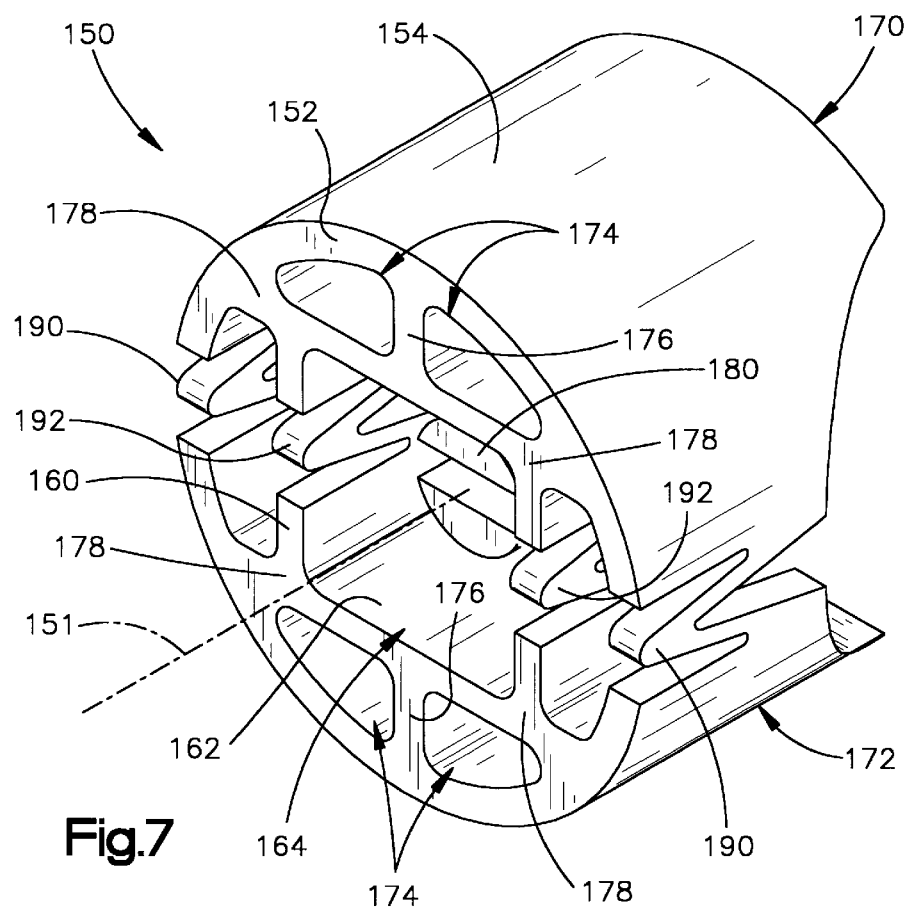
FIG. 7 is a perspective view similar to FIG. 2 showing a rack guide comprising a third embodiment of the present invention.
Figure 8:
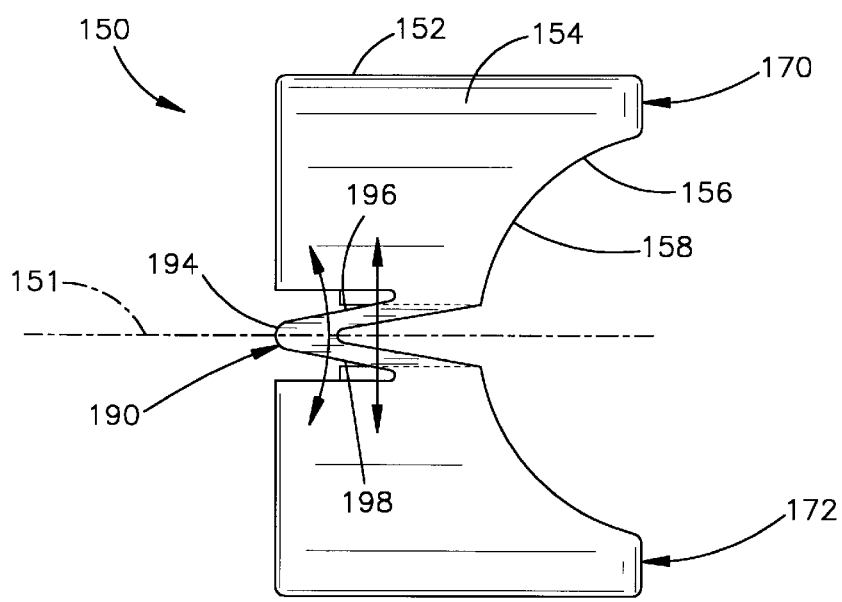
FIG. 8 is a side view of the rack guide of FIG. 7.

A rack guide 150 comprising a third embodiment of the present invention is shown in FIGS. 7 and 8. The rack guide 150 also is a unitary structure consisting of a single continuous body of molded plastic material with a cylindrical shape centered on an axis 151.

A peripheral wall 152 of the rack guide 150 defines an outer peripheral surface 154 with a cylindrical contour complementary to the cylindrical inner surface 44 (FIG. 1) of the housing 12. An end wall 156 of the rack guide 150 defines a concave guide surface 158 with a cylindrical contour complementary to the cylindrical surface portion 56 of the rack 14. A rectangular inner wall structure 160 defines an inner peripheral wall surface 162 which, in turn, defines a rectangular compartment 164 for receiving the spring 36. However, unlike the corresponding portions of the rack guides 30 and 120 described above, those walls and surfaces of the rack guide 150 are not continuous entirely around the axis 151. Instead, the rack guide 150 has a pair of circumferentially separate segments 170 and 172, each of which defines a respective segmental portion of the peripheral wall 152, the end wall 156, and the inner wall structure 160. Each of the segments 170 and 172 further defines a respective pair of weight-reduction cavities 174 between a stiffener wall 176 and a corresponding pair of corner junctures 178, as well as a respective segmental portion of a cylindrical stub shaft 180 for centering the spring 36.

Although a rack guide constructed in accordance with the present invention can have a different number of segments with correspondingly different circumferential extents, the rack guide 150 in the third embodiment of the present invention has only two segments 170 and 172 with substantially semi-cylindrical configurations. Each of the two segments 170 and 172 thus defines half of the peripheral wall 152, the end wall 156, the inner wall structure 160 and the stub shaft 180.

The rack guide 150 further has a plurality of connector parts which interconnect and support the segments 170 and 172 for movement relative to each other. Such connector parts preferably comprise flexible webs in a row extending diametrically across the rack guide 150. These include a pair of outer webs 190 and a pair of inner webs 192. The outer webs 190 extend between circumferentially adjacent portions of the peripheral wall 152 at diametrically opposite locations. The inner webs 192 extend between the two halves of the inner wall structure 160 at opposite sides of the inner wall structure 160.

The inner and outer webs 190 and 192 are alike. As shown in FIG. 8 with reference to one of the outer webs 190, each web is a generally V-shaped structure with a curved base 194 and a pair of flexible arms 196 and 198. The arms 196 and 198 diverge from the base 194 in a direction extending along the length of the rack guide 150, and extend longitudinally from the base 194 to the segments 170 and 172. The web 190 is flexible such that the arms 196 and 198 are movable relative to each other pivotally about the base 194. The web 190 thus interconnects and supports the segments 170 and 172 for movement relative to each other in directions indicated generally by the arrows shown in FIG. 8.

More specifically, the segments 170 and 172 are movable pivotally relative to each other as indicated by the arcuate arrow shown in FIG. 8. The segments 170 and 172 are further movable radially relative to each other, either with or without simultaneous pivotal movement, as indicated by the linear arrow shown in FIG. 8. The webs 190 and 192 also enable a small amount of rotational movement of the segments 170 and 172 relative to each other about the axis 151. Such rotational movement of the segments 170 and 172 can occur when one or both pairs of web arms 196 and 198 on one side of the axis 151 are flexibly deflected toward each other, with the web arms 196 and 198 on the other side of the axis 151 being simultaneously deflected away from each other. Such movement of the segments 170 and 172 helps to ensure that the outer peripheral surface 154 fits closely with the cylindrical inner surface 44 of the housing 12, and also helps to ensure that the guide surface 158 fits closely with the cylindrical surface portion 56 of the rack 14.

Figure 9:
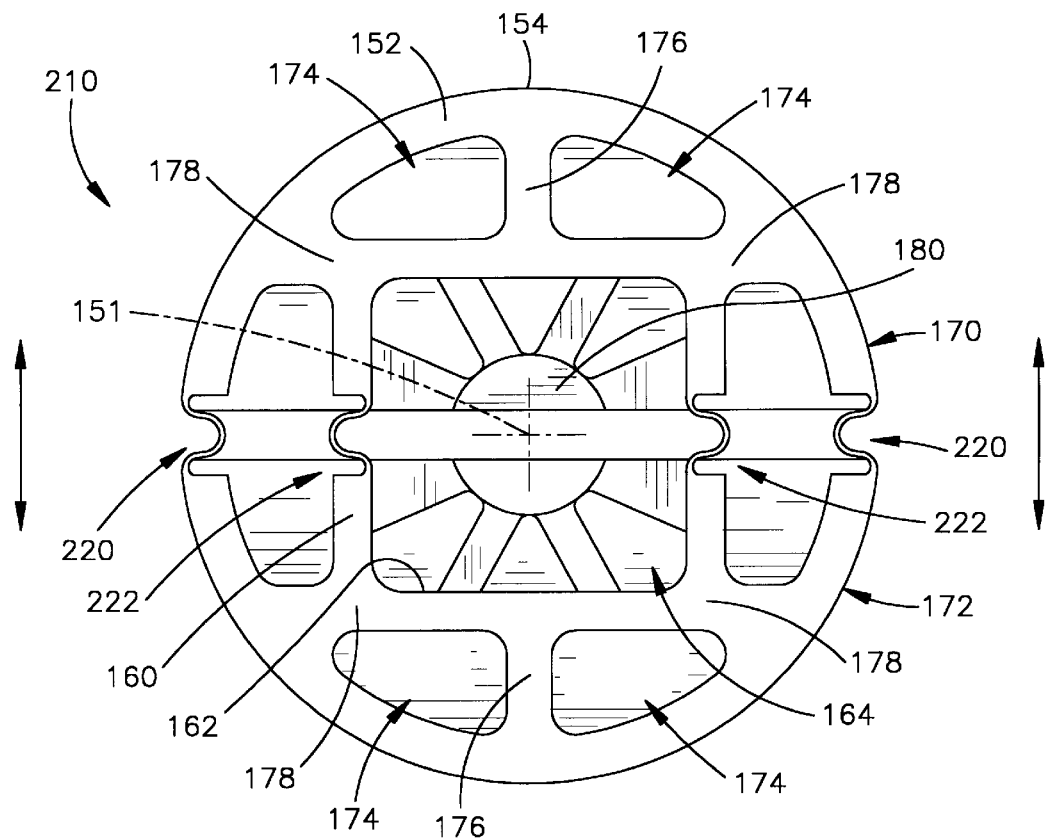
FIG. 9 is an end view of a rack guide comprising a fourth embodiment of the present invention.
Figure 10:
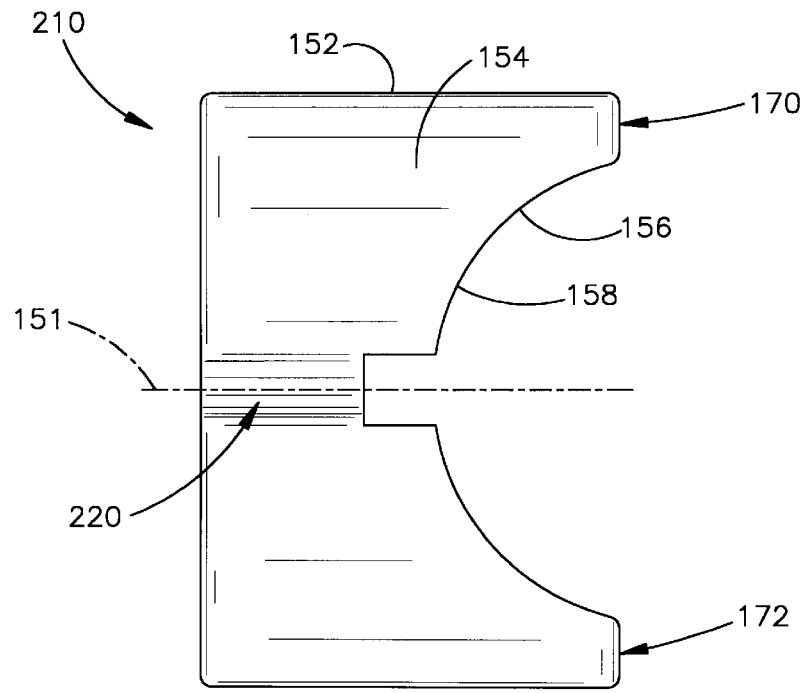
FIG. 10 is a side view of the rack guide of FIG. 9.

A rack guide 210 comprising a fourth embodiment of the present invention is shown in FIGS. 9 and 10. The rack guide 210 has several parts that are substantially the same as corresponding parts of the rack guide 150 described above. This is indicated by the use of the same reference numbers for such parts in FIGS. 9–10 and 7–8. The rack guide 210 thus has a pair of substantially semi-cylindrical segments 170 and 172, each of which defines respective segmental portions of a cylindrical peripheral wall 152, a concave end wall 156, and a rectangular inner wall structure 160.

The rack guide 210 further includes a plurality of flexible webs which interconnect and support the segments 170 and 172 for movement relative to each other. Like the webs in the rack guide 150, the webs in the rack guide 210 include a pair of outer webs 220 joining halves of the peripheral wall 152, and further include a pair of inner webs 222 joining halves of the inner wall structure 160.

The configurations of the webs 220 and 222 differ from the configurations of the webs 190 and 192. Each of the webs 220 and 222 extends between the segments 170 and 172 in a curvilinear configuration as viewed on end (FIG. 9). Accordingly, each of the webs 220 and 222 is independently contractible and extendible in directions parallel to the linear arrows shown in FIG. 9. The webs 220 and 222 thus support the segments 170 and 172 for relative movement which includes movement radially relative to the axis 151, and which further includes movement rotationally about the axis 151.

From the above description of the invention, those skilled in the art will perceive improvements, changes and modifications. Such improvements, changes and modifications within the skill of the art are intended to be covered by the appended claims.

Having described the invention, the following is claimed:

1. A rack guide for transmitting a preloading force from a spring to a steering rack in a rack and pinion steering gear housing, said rack guide comprising:

a unitary cylindrical structure having an outer peripheral wall surface with a cylindrical contour complementary to a cylindrical inner surface of the housing, and having an end wall surface with a cylindrical contour complementary to a cylindrical surface of the rack;

said unitary cylindrical structure having a plurality of relatively movable parts including circumferentially separate segments, each of said segments defining a respective segmental portion of said outer peripheral wall surface;

said relatively movable parts further including a flexible web which interconnects and supports an adjacent pair of said segments for movement relative to each other upon deflection of said web without deflection of said segments.

2. A rack guide as defined in claim 1 wherein each of said segments has a substantially semi-cylindrical shape, said web being one of a pair of webs extending circumferentially between said segments at diametrically opposite locations.

3. A rack guide as defined in claim 1 wherein said unitary cylindrical structure is a single continuous body of molded plastic material.

4. A rack guide as defined in claim 1 wherein said web supports said segments for relative movement including radial movement without simultaneous pivotal movement.

5. A rack guide as defined in claim 1 wherein said unitary cylindrical structure has a longitudinal central axis and said relative movement includes rotational movement about said axis.

6. A rack guide for transmitting a preloading force from a spring to a steering rack in a rack and pinion steering gear housing, said rack guide comprising:

a unitary cylindrical structure having an outer peripheral wall surface with a cylindrical contour complementary to a cylindrical inner surface of the housing, an end wall surface with a cylindrical contour complementary to a cylindrical surface of the rack, and an inner peripheral wall surface defining a compartment for receiving the spring;

said unitary cylindrical structure having a plurality of circumferentially separate segments/and including a plurality of flexible webs which interconnect and support said segments for movement relative to each other upon deflection of said webs without deflection of said segments, each of said segments defining a segmental portion of a respective one of said wall surfaces.

7. A rack guide as defined in claim 6 wherein said unitary cylindrical structure is a single continuous body of molded plastic material.

8. A rack guide as defined in claim 6 wherein said webs support said segments for relative movement including radial movement without simultaneous pivotal movement.

9. A rack guide as defined in claim 6 wherein said unitary cylindrical structure has a longitudinal central axis and said relative movement includes rotational movement about said axis.

* * * * *